United States Patent [19]
Firdaus et al.

[11] Patent Number: 5,840,244
[45] Date of Patent: Nov. 24, 1998

[54] HIGH IMPACT LLDPE FILMS WITH HIGH STALK EXTRUSION

[75] Inventors: Vaseem Firdaus; Pradeep P. Shirodkar, both of Somerset, N.J.

[73] Assignee: Mobil Oil Corporation, Fairfax, Va.

[21] Appl. No.: 820,461

[22] Filed: Jan. 14, 1992

[51] Int. Cl.⁶ .......................... B29C 47/20; B29C 47/88
[52] U.S. Cl. ................... 264/565; 264/566; 526/348.1; 526/348.5
[58] Field of Search ................ 526/348.1; 425/72.1; 264/565, 566

[56] References Cited

U.S. PATENT DOCUMENTS

| | | | |
|---|---|---|---|
| 4,118,453 | 10/1978 | Herrington | 425/72.1 |
| 4,264,472 | 4/1981 | Ikegami et al. | 252/429 |
| 4,481,301 | 11/1984 | Nowlin et al. | 502/104 |
| 4,606,879 | 8/1986 | Cerisano | 264/565 |
| 4,624,823 | 11/1986 | Audareau et al. | 425/72.1 |
| 4,632,801 | 12/1986 | Dowd | 425/72.1 |
| 4,657,998 | 4/1987 | Malpass | 526/144 |
| 4,750,874 | 6/1988 | Keim | 425/72.1 |
| 4,832,897 | 5/1989 | Van Der Molen | 526/348.1 |
| 5,126,096 | 6/1992 | Grady | 425/72.1 |
| 5,210,167 | 5/1993 | Firdaus et al. | 526/348.1 |

OTHER PUBLICATIONS

Encyclopedia of Polymer Science and Engineering, vol. 6, "Ethylene Polymers", John Wiley & Sons, pp. 429–454. 1986.

*Primary Examiner*—David W. Wu
*Attorney, Agent, or Firm*—Dennis P. Santini

[57] ABSTRACT

Blown films of linear low density polyethylene are produced by a high stalk process comprising extruding the linear low density polyethylene through an annular die to form an extruded tube of molten material, cooling the extruded tube while drawing the tube so cooled, to maintain the tube diameter identical to that of the annular die and expanding the tube or bubble to attenuate the walls thereof by introducing a gas to the interior of the tube or bubble. The resulting films are characterized by superior impact strength and MD tear resistance.

24 Claims, No Drawings

HIGH IMPACT LLDPE FILMS WITH HIGH STALK EXTRUSION

FIELD OF THE INVENTION

The invention relates to the production of linear low density polyethylene (LLDPE) films. The LLDPE films are characterized by superior impact strength and MD tear resistance. The process of the invention comprises high stalk extrusion of LLDPE composition having molecular weight distributions, determined as $M_z/M_w$ of greater than 3.5. The film products of high stalk extrusion exhibit Dart Drop impact values and MD tear resistance which are superior to those same values for films, of the same composition at the same thickness and density, but produced by methods other than high stalk extrusion.

SUMMARY OF THE INVENTION

The invention relates to the production of blown films of linear low density polyethylene. It also relates to polymers of linear low density polyethylene which exhibit molecular weight distributions as measured by $M_z/M_w > 3.5$ which are formed in one reactor. Films of these polymeric products and the particular film production technique of the invention, high stalk extrusion, results in enhancing impact strengths and MD tear resistance.

That molecular weight distribution, as measured by $M_z/M_w$ in the-LLDPE appears to be attributable to the use of dimethyl aluminum chloride as a cocatalyst, combined with a catalyst precursor, in the production of the LLDPE.

The subject molecular weight distribution, $M_z/M_w$ greater than 3.5, appears to be attributable to a high molecular weight fraction in the LLDPE which, in turn, appears to enhance the melt strength of the LLDPE, and to make it eminently useful in the process of the invention.

DETAILED DESCRIPTION OF THE INVENTION

In accordance with the invention, LLDPE films are produced which are characterized by superior impact strength and MD tear resistance. Herein, impact strength is determined by dart impact (ASTM-1709). The dart impact resistance, measured in grams, of films of the invention ranges from 50 to >800, preferably 200 to >800, and most preferably 350 to >800 for example 800 to 1000. MD tear resistance of films of the invention are determined by ASTM-D1922, measured in grams/mil, ranges from 50 to 500, preferably 200 to 500, and most preferably 250 to 500.

The copolymer products used in the invention contain 70 to 350 ppm of dimethylaluminum chloride (DMAC) activator.

They are low density products characterized by a density ranging from 0.915 to 0.940 g/cm³. They exhibit a melt flow ratio range of 25 to 45.

As noted above, the copolymers used in the invention exhibit rather broad molecular weight distribution (MWD), as characterized by a $M_z/M_w$ of greater than 3.5, and are not unimodal. The ratio $M_z/M_w$ is a measure of the skewness of the molecular weight distribution towards the HMW part of the distribution. The individual moments are defined as follows:

$$M_w = \text{Weight Average Molecular Weight} = \frac{\Sigma M_i w_i}{\Sigma w_i}$$

$$M_z = \text{"Z" Average Molecular Weight} = \frac{\Sigma M_i^2 w_i}{\Sigma M_i w_i}$$

where $w_i$=weight fraction of the polymer with molecular weight between $M_i$ and $M_i + \Delta M$.

For the invention polymers with a significant hump on the HMW side, the higher moment $M_z$ is significantly higher for the same $M_w$ as a normal LLDPE. Thus resulting in a higher $M_z/M_w$.

The invention LLDPE is typically broader in molecular weight distribution as measured by GPC or flow properties (MFR). The GPC curve is characterized by a significantly higher amount of high molecular weight species compared to a normal LLDPE. The GPC analysis was performed on a Waters 150C instrument with a set of 4 columns (1E6, 1E6, 1E4, 1E3 angstrom) at 140° C. All the analyses were performed with a 0.1% % solution in 1-2-4 trichlorobenzene. The most consistent way of characterizing this difference is by the ratio Mz/Mw which measures the skewness of the distribution on the HMW side. We find that the DMAC cocatalyzed LLDPEs have Mz/Mw that is consistently higher than 4 while normal LLDPEs tend to be around 3. The presence of the HMW species may also provide an explanation of the observed improvement in the optical properties of the invention LLDPE. It may be argued that the presence of the HMW species gives rise to significantly higher stresses prior to the onset of crystallization, retarding crystal growth. This may be of even greater significance at the surface of the polymer film. The DMAC LLDPE films tend to have smoother surfaces compared to normal LLDPEs and consequently have better opticals, i.e. lower haze and higher gloss.

Polymerization

Olefins are polymerized with the catalysts prepared according to the present invention by any suitable process. Such processes include polymerizations carried out in suspension, in solution or in the gas phase. Gas phase polymerization reactions are preferred, e.g., those taking place in stirred bed reactors and, especially, fluidized bed reactors.

The linear polyethylene polymers prepared in accordance with the present invention are homopolymers of ethylene or copolymers of ethylene with one or more $C_3$–$C_{10}$ alpha-olefins. Thus, copolymers having two monomeric units are possible as well as terpolymers having three monomeric units. Particular examples of such polymers include ethylene/1-butene copolymers, ethylene/1-hexene copolymers, ethylene/1-octene copolymers, ethylene/4-methyl/1-pentene copolymers, ethylene/1-butene/1-hexene terpolymers, ethylene/propylene/1-hexene terpolymers and ethylene/propylene/1-butene terpolymers. When propylene is employed as a comonomer, the resulting linear low density polyethylene polymer preferably has at least one other alpha-olefin comonomer having at least four carbon atoms in an amount of at least 1 percent by weight of the polymer. Accordingly, ethylene/propylene copolymers are possible, but not preferred. The most preferred comonomer is 1-hexene.

The linear low density polyethylene polymers produced in accordance with the present invention preferably contain at least about 80 percent by weight of ethylene units.

The molecular weight of the polymer may be controlled in a known manner, e.g., by using hydrogen. With the catalysts used in the present invention, molecular weight may be suitably controlled with hydrogen when the polymerization is carried out at relatively low temperatures, e.g., from about 30° to about 105° C. This control of molecular weight may be evidenced by measurable positive change in melt index ($I_2$) of the polymer produced.

When hydrogen is employed as a diluent gas, the diluent serves not only to dilute the reaction mixture and prevent polymer agglomeration, but also acts as a chain transfer agent to regulate the melt index of the copolymers produced by the process. Generally, the reaction mixture contains hydrogen in an amount sufficient to produce a hydrogen to ethylene mole ratio of from 0.01:1 to 0.5:1. The molecular weight of the polymer may be controlled in a known manner, e.g., by using hydrogen. With the catalysts produced according to the present invention, molecular weight may be suitably controlled with hydrogen when the polymerization is carried out at relatively low temperatures, e.g., from about 70 to about 105° C. The molecular weight control is evidenced by a measurable positive change in melt index ($I_2$) of the polymer when the molar ratio of hydrogen to ethylene in the reactor is increased.

Exact conditions in the reactor may vary depending on the concentration of diluent gas with higher diluent gas concentrations permitting the use of somewhat higher temperature. Temperatures can generally range from 40° C. to 95° C.

In fluidized bed reactors, the superficial gas velocity of the gaseous reaction mixture through the bed must exceed the minimum flow required for fluidization, and preferably is at least 0.2 feet per second above the minimum flow. Ordinarily the superficial gas velocity does not exceed 5.0 feet per second, and most usually no more than 2.5 feet per second is sufficient.

A particularly desirable method for producing linear low density polyethylene polymers according to the present invention is in a fluid bed reactor. Such a reactor and means for operating it are described by Levine et al, U.S. Pat. No. 4,011,382, Karol et al, U.S. Pat. 4,302,566 and by Nowlin et al, U.S. Pat. No. 4,481,301, the entire contents of which are incorporated herein by reference. The polymer produced in such a reactor contains the catalyst particles because the catalyst is not separated from the polymer.

The Catalysts

The catalysts used in the present invention, containing DMAC as a cocatalyst, provide ethylene polymers and copolymers, of densities ranging from 0.915 to 0.950 and $I_2$ ranging from 0.2 to 1.5 and which exhibit melt strengths which allow film production in accordance with the parameters set forth below. Commercially available LLDPE without the $M_z/M_w$>3.5 cannot be blown into films in accordance with the process described below, which requires bubble blown film and a bubble of at least two different diameters. The molecular weight distribution of the polymers prepared in accordance with the present invention, as expressed by the MFR values, varies from about [20 to about 40, preferably about 25 to about 35], for LLDPE products having a density of about 0.900 to about 0.940 g/cc, and an $I_2$ (melt index) of about 0.1 to about 100.

The Catalyst

The catalyst compositions employed to produce resins and films of the present invention require a DMAC cocatalyst combined with a catalyst precursor composition comprising a magnesium compound, and a compound of a transition metal, preferably titanium. The precursor can be formed in a solvent which may be either a non-polar solvent or an electron donor. The precursor is reacted with a cocatalyst (or activator) which is dimethylaluminum chloride either outside of the reactor vessel or inside the vessel with the catalyst activator.

The activator is employed in an amount which is at least effective to promote the polymerization activity of the solid component of the catalyst of this invention. Preferably, the activator is used in such amounts that the concentration thereof in the polymer product is about 15 to about 400 parts per million (ppm), preferably it is about 60 to about 200 ppm, and most preferably about 80 to about 200 ppm. In slurry polymerization processes, a portion of the activator can be employed to pretreat the polymerization medium if desired.

The catalyst may be activated in situ by adding the activator and catalyst separately to the polymerization medium. It is also possible to combine the catalyst and activator before the introduction thereof into the polymerization medium, e.g., for up to about 2 hours prior to the introduction thereof into the polymerization medium at a temperature of from about 60° to about 120° C.

A suitable activating amount of the activator may be used to promote the polymerization activity of the catalyst. The aforementioned proportions of the activator can also be expressed in terms of the number of moles of activator per gram atom of titanium in the catalyst composition, e.g., from about 6 to about 80, preferably about 8 to about 30 moles of activator per gram atom of titanium.

1. Precursor formed in Electron Donor

Suitable transition metal compounds are compounds of Groups IVA, VA, or VIA, VIIA or VIII of the Periodic Chart of the Elements, published by the Fisher Scientific Company, Catalog No. 5-702-10, 1978, e.g., compounds of titanium (Ti), zirconium (Zr), vanadium (V), tantalum (Ta), chromium (Cr) and molybdenum (Mo), such as $TiCl_4$, $TiCl_3$, $VCl_4$, $VCl_3$, $VOCl_3$, $MoCl_5$, $ZrCl_5$ and chromiumacetylacetonate. Of these compounds, the compounds of titanium and vanadium are preferred, and the compounds of titanium are most preferred.

The structure of titanium compound(s) employed in preparing the precursor composition has a formula $$Ti(OR)_a X_b$$

wherein R is an aliphatic or aromatic hydrocarbon radical containing from 1 to 14 carbon atoms, or COR' where R' is an aliphatic or aromatic hydrocarbon radical containing from 1 to 14 carbon atoms, X is selected from the group consisting of Cl, Br, I, and mixtures thereof, a is 0, 1 or 2, b is 1 to 4 inclusive, and a+b=3 or 4.

Suitable titanium compounds include $TiCl_3$, $TiCl_4$, $Ti(OCH_3)Cl_3$, $Ti(OC_6H_5)Cl_3$, $Ti(OCOCH_3)Cl_3$ and $Ti(OCOC_6H_5)Cl_3$. In some instances, $TiCl_3$ may be preferred because catalysts containing this material show higher activity at the low temperatures and monomer concentrations employed in the process of the present invention.

The formula of magnesium compound(s) employed in preparing the precursor composition is $$MgX_2$$

wherein X is selected from the group consisting of Cl, Br, I, and mixtures thereof.

Suitable magnesium compounds include $MgCl_2$, $MgBr_2$ and $MgI_2$. Anhydrous $MgCl_2$ is particularly preferred.

The solvent or electron donor compound(s) employed in preparing the precursor composition is an organic compound which is liquid at 25° C. and in which the titanium and magnesium compounds are soluble. The electron donor compounds are known as such, or as Lewis bases.

Suitable electron donor compounds include the alkyl esters of aliphatic and aromatic carboxylic acids, aliphatic ethers, cyclic ethers and aliphatic ketones. Among these electron donor compounds the preferable ones are alkyl esters of saturated aliphatic carboxylic acids containing from 1 to 4 carbon atoms; alkyl esters of aromatic carboxylic acids containing from 7 to 8 carbon atoms; aliphatic ethers containing from 2 to 8 carbons atoms, preferably from 4 to 5 carbon atoms; cyclic ethers containing from 4 to 5 carbon atoms, preferably mono- or di-ethers containing 4 carbon atoms; and aliphatic ketones containing from 3 to 6 carbon atoms, preferably from 3 to 4 carbon atoms. The most preferred of these electron donor compounds include methyl formate, ethyl acetate, butyl acetate, ethyl ether, tetrahydrofuran, dioxane, acetone and methyl ethyl ketone.

The precursor composition is formed by dissolving at least one transition metal compound, such as a titanium compound and at least one magnesium compound in at least one electron donor compound at a temperature of from about 20° C. up to the boiling point of the electron donor compound. Any one or a combination of any of the well known transition metal compounds can be used in preparing the catalyst precursor of this invention. The titanium compound (s) can be added to the electron donor compound(s) before or after the addition of the magnesium compound(s), or concurrent therewith. The dissolution of the titanium compound(s) and the magnesium compound(s) can be facilitated by stirring, and in some instances by refluxing, these two compounds in the electron donor compound(s).

After the titanium compound(s) and the magnesium compound(s) are dissolved, the precursor composition may be isolated by crystallization or by precipitation with an aliphatic or aromatic hydrocarbon containing from 5 to 8 carbon atoms, such as hexane, isopentane or benzene. The crystallized or precipitated precursor composition may be isolated in the form of fine, free-flowing particles having an average particle size of from about 10 microns to about 100 microns after drying at temperatures up to 60° C.

About 0.5 mol to about 56 mols, and preferably about 1 mole to about 10 moles, of the magnesium compound(s) are used per mole of the titanium compound(s) in preparing the precursor composition.

In accordance with the invention, the catalyst precursor can be prereduced with a pre-reducing reagent prior to contact with the cocatalyst. That is, the precursor can be contacted with at least one pre-reducing agent such as diethylaluminum chloride or tri-n-hexyl aluminum (TNHAL) and admixtures thereof. This prereduction reaction provides an important control of the early stage of reaction to prevent excessively high peak activity and temperature which results in polymer product of very low bulk density.

The precursor composition may be diluted with an inert carrier material by (1) mechanically mixing or (2) impregnating such composition into the carrier material.

Mechanical mixing of the inert carrier and precursor composition is effected by blending these materials together using conventional techniques. The blended mixture suitably contains from about 3 percent by weight to about 50 percent by weight of the precursor composition.

Impregnation of the inert carrier material with the precursor composition may be accomplished by dissolving the precursor composition in the electron donor compound, and then admixing the support with the dissolved precursor composition to impregnate the support. The solvent is then removed by drying at temperatures up to about 85° C.

The support may also be impregnated with the precursor composition by adding the support to a solution of the chemical raw materials used to form the precursor composition in the electron donor compound, without isolating the precursor composition from said solution. The excess electron donor compound is then removed by drying at temperatures up to about 85° C.

When made as disclosed above, the blended or impregnated precursor composition has the formula

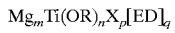

$$Mg_m Ti(OR)_n X_p [ED]_q$$

wherein R is an aliphatic or aromatic hydrocarbon radical containing from 1 to 14 carbon atoms, or COR' wherein R' is also an aliphatic or aromatic hydrocarbon radical containing from 1 to 14 carbon atoms, X is selected from the group consisting of Cl, Br, I, and mixtures thereof, ED is an electron donor compound, m is 0.5 to 56, preferably 1.5 to 5, n is 0, 1 or 2, p is 2 to 116, preferably 6 to 14, and q is 2 to 85, preferably 3 to 10.

Suitably, the impregnated carrier material contains from about 3 percent by weight to about 50 percent by weight, preferably from about 10 percent by weight to about 30 percent by weight, of the precursor composition.

The carrier materials employed to dilute the precursor composition are solid, particulate, porous materials which are inert to the other components of the catalyst composition, and to the other active components of the reaction system. These carrier materials include inorganic materials such as oxides of silicon and/or aluminum. The carrier materials are used in the form of dry powders having an average particle size of from about 10 microns to about 250 microns, preferably from about 20 microns to about 150 microns. These materials are also porous and have a surface area of at least 3 square meters per gram, and preferably at least 50 square meters per gram. Catalyst activity or productivity can apparently be improved by employing a silica support having average pore sizes of at least 80 angstrom units, preferably at least 100 Angstrom units. The carrier material should be dry, that is, free of absorbed water. Drying of the carrier material can be effected by heating, e.g., at a temperature of at least 600° C. when silica is employed as the support. Alternatively, when silica is employed, it may be dried at a temperature of at least 200° C. and treated with about 1 weight percent to about 8 weight percent of one or more of the aluminum activator compounds described below. Modification of the support with an aluminum compound in this manner provides the catalyst composition with increased activity and also improves polymer particle morphology of the resulting ethylene copolymers.

The transition metal compound is reacted with the DMAC activator, in accordance with the invention, in any conventional manner in which the transition metal compounds of prior art were reacted with the activators used in prior art. For example, the transition metal compound can be dissolved in a suitable solvent, e.g., isopentane or hexane, and the resulting solution reacted with activator, which may also be used as a solution in a suitable solvent, e.g., isopentane. It is preferable, however, to introduce the catalyst precursor into a reactor and introduce the activator into the reactor simultaneously with the introduction of the catalyst precursor or after the introduction of the precursor is terminated.

2. Precursor formed in Non-Polar Solvent

In accordance with this aspect of the invention, supported titanium is incorporated onto a suitable support by impregnating this support with reactive magnesium and utilizing this supported reactive magnesium to react with tetravalent titanium (i.e., titanium in the plus 4 valence state) in a liquid medium. Unreacted titanium is soluble in this liquid medium, while reacted titanium and supported reactive magnesium are insoluble in this liquid medium.

Suitable carrier materials which may be treated include solid, porous carrier materials such as silica, alumina and combinations thereof. Such carrier materials may be amorphous or crystalline in form. These carriers may be in the form of particles having a particle size of from about 0.1 micron to about 250 microns, preferably from 10 to about 200 microns, and most preferably from about 10 to about 80 microns. Preferably, the carrier is in the form of spherical particles, e.g., spray dried silica.

The carrier material is also porous. The internal porosity of these carriers may be larger than 0.2 cm$^3$/gm, e.g., larger than about 0.6 cm$^3$/g. The specific surface area of these carriers is at least 3 m$^2$/g, preferably at least about 50 m$^2$/g, and more preferably from, e.g., about 150 to about 1500 m$^2$/g.

It is desirable to remove physically bound water from the carrier material prior to contacting this material with water-reactive magnesium compounds. This water removal may be accomplished by heating the carrier material to a temperature from about 100° C. to an upper limit of temperature represented by the temperature at which change of state or sintering occurs. A suitable range of temperatures may, thus, be from about 100° C. to about 800° C., e.g., from about 150° C. to about 650° C.

Silanol groups represented by a presence of Si—OH groups in the carrier, may be present when the carrier is contacted with water-reactive magnesium compounds in accordance with an aspect of the present invention. These Si—OH groups may be present at about 0.3 mmoles or more of OH groups per gram of carrier. Accordingly, an amount of, e.g., from about 0.5 to about 5 mmoles of OH groups per gram of carrier may be present, but a preferred range is from about 0.4 to about 0.9 mmoles of OH groups per gram of carrier. Excess OH groups present in the carrier may be removed by heating the carrier for a sufficient time at a sufficient temperature to accomplish the desired removal. More particularly, for example, a relatively small number of OH groups may be removed by sufficient heating at from about 150° C. to about 250° C., whereas a relatively large number of OH groups may be removed by sufficient heating at at least 500° or 800° C., most especially, from about 550° C. to about 650° C. The duration of heating may be overnight, e.g., 16 hours or a shorter period, e.g., at least 4 hours. In a most preferred embodiment, the carrier is silica which, prior to the use thereof in the first catalyst synthesis step, has been dehydrated by fluidizing it with nitrogen or air and heating at least about 600° C. for about 16 hours to achieve a surface hydroxyl group concentration of about 0.7 millimoles per gram (mmols/gm). The surface hydroxyl concentration of silica may be determined according to J. B. Peri and A. L. Hensley, Jr., *J. Phys. Chem.*, 72 (8), 2926 (1968). The silica of the most preferred embodiment is a high surface area, amorphous silica (surface area=300 m$^2$/gm; pore volume of 1.65 cm$^3$/gm), and it is a material marketed under the tradenames of Davison 952 or Davison 955 by the Davison Chemical Division of W. R. Grace and Company. When silica which has been dehydrated by fluidizing with nitrogen or air and heating at about 600° C. for about 16 hours, the surface hydroxyl concentration is about 0.72 mmols/g. The silica used may be a high surface area, amorphous silica (surface area=300 m$^2$/g; pore volume of 1.65 cm$^3$ per gram) marketed under the tradename Davison 952 by the Davison Division of W. R. Grace and Co.

While heating is a preferred means of removing OH groups inherently present in a carrier such as silica, other removal means are also possible such as chemical means. For example, a desired proportion of OH groups may be reacted with a chemical agent such as a hydroxyl reactive aluminum compound, e.g., triethylaluminum.

Specific surface areas of carriers can also be measured in accordance with the above-mentioned BET-technique, with use of the standardized method as described in *British Standards* BS 4359, Volume 1, (1969).

The carrier material is slurried in a non-polar solvent and the resulting slurry is contacted with at least one organomagnesium composition. The slurry of the carrier material in the solvent is prepared by introducing the carrier into the solvent, preferably while stirring, and heating the mixture to about 25° to about 100° C., preferably to about 40° to about 60° C. The slurry is then contacted with the aforementioned organomagnesium composition, while the heating is continued at the aforementioned temperature.

The organomagnesium composition has the empirical formula

where R and R' are the same or different C$_2$–C$_{12}$ alkyl groups, preferably C$_4$–C$_{10}$ alkyl groups, more preferably C$_4$–C$_8$ alkyl groups, and most preferably both R and R' are butyl groups, and m and n are each 0, 1 or 2, providing that m+n is equal to the valence of Mg.

Suitable non-polar solvents are materials in which all of the reactants used herein, e.g., the organomagnesium composition, the transition metal compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene and ethylbenzene, may also be employed. The most preferred non-polar solvent is isopentane. Prior to use, the non-polar solvent should be purified, such as by percolation through silica gel and/or molecular sieves, to remove traces of water, oxygen, polar compounds, and other materials capable of adversely affecting catalyst activity.

In the most preferred embodiment of the synthesis of this catalyst it is important to add only such an amount of the organomagnesium composition that will be deposited—physically or chemically—onto the support since any excess of the organomagnesium composition in the solution may react with other synthesis chemicals and precipitate outside of the support. The carrier drying temperature affects the number of sites on the carrier available for the organomagnesium composition—the higher the drying temperature the lower the number of sites. Thus, the exact molar ratio of the organomagnesium composition to the hydroxyl groups will vary and must be determined on a case-by-case basis to assure that only so much of the organomagnesium composition is added to the solution as will be deposited onto the support without leaving any excess of the organomagnesium composition in the solution. Furthermore, it is believed that the molar amount of the organomagnesium composition deposited onto the support is greater than the molar content of the hydroxyl groups on the support. Thus, the molar ratios given below are intended only as an approximate guideline and the exact amount of the organomagnesium composition in this embodiment must be controlled by the functional limitation discussed above, i.e., it must not be greater than that which can be deposited onto the support. If greater than that amount is added to the solvent, the excess may react with the reagents added subsequently to form the catalyst of the invention, thereby forming a precipitate outside of the support which is detrimental in the synthesis of our catalyst and must be avoided. The amount of the organomagnesium composition which is not greater than that deposited onto the support can be determined in any conventional manner, e.g., by adding the organomagnesium composition to the slurry of the carrier in the solvent, while stirring the slurry, until the organomagnesium composition is detected as a solution in the solvent.

For example, for the silica carrier heated at about 600° C., the amount of the organomagnesium composition added to the slurry is such that the molar ratio of Mg to the hydroxyl groups (OH) on the solid carrier is about 1:1 to about 4:1, preferably about 1.1:1 to about 2.8:1, more preferably about 1.2:1 to about 1.8:1 and most preferably about 1.4:1. The organomagnesium composition dissolves in the non-polar solvent to form a solution from which the organomagnesium composition is deposited onto the carrier.

Preferably, the carrier should be impregnated such that the pores of same contain reactive solid magnesium containing composition. A preferred means of accomplishing this result is by incorporating a porous carrier in a liquid medium containing dissolved organomagnesium composition and allowing magnesium to become impregnated into the pores of the carrier by (1) a reaction of the organomagnesium composition with the carrier, by (2) a precipitation of magnesium from the organomagnesium composition onto the carrier or by (3) a combination of such reaction and precipitation. Evaporation of the non-polar solvent which is a non-Lewis base liquid from this step would obtain a carrier, containing magnesium, in the form of a dry, free-flowing powder.

The amount of magnesium composition which is impregnated onto the carrier should be sufficient to react with the silane compound and then the tetravalent titanium compound in order to incorporate a catalytically effective amount of titanium on the carrier in the manner set forth hereinbelow. When a liquid containing an organomagnesium composition is contacted with a carrier the amount of magnesium in this liquid in terms of mmoles may be essentially the same as that stated above with respect to that which is impregnated onto the carrier.

In accordance with commonly assigned [Mobil Docket 6407], an essential component in the production of the catalyst composition of the invention is a silane compound which is free of hydroxy groups. The silane compound has the empirical formula $$R^1_x SiR^2_y$$

wherein Si is silicon atom; x is 1, 2, 3, or 4 and y is 0, 1, 2, or 3, provided that x+y is 4; $R^1$ is $R_w$—O— wherein O is oxygen and $R_w$ is hydrocarbyl of 1 to 10 carbon atoms; and $R^2$ is halogen, preferably chlorine, hydrogen or hydrocarbyl of 1 to 10 carbon atoms. Preferred species of that empirical formula are those defined by $Si(OR)_4$ wherein R is $C_1$–$C_{10}$ hydrocarbyl and $Si(R''O)_n(R''')_{(4-n)}$ wherein R''' is halogen, preferably chlorine, or $C_1$–$C_{10}$ hydrocarbyl or hydrogen. Hydrocarbyl groups include alkyl, aryl, arylalkyl, alkenyl and arylalkenyl, containing 1 to 10 carbon atoms. Specific silane compounds which can be used in accordance with the invention include tetramethoxysilane, dimethoxydimethylsilane tetraethoxysilane, phenoxytrimethytrimethylsilane, triethoxyethylsilane, diethoxydiethylsilane, chlorotriethoxysilane, phenyltriethoxysilane, ethoxytriethylsilane, tetraisopropoxysilane, diisopropoxydiisopropylsilane, tetrapropoxysilane, dipropoxydipropylsilane, tetrabutoxysilane, dibutoxydibutylsilane, diethoxydiphenylsilane, tetraphenoxysilane, triethoxyphenylsilane, hexamethyldisiloxane, hexaethydisiloxane, octaethyltrisiloxane, polydimethylsiloxane, polydiphenylsiloxane, polymethylhydrosiloxane, polyphenylhydrosiloxane, tetrakis(2-methoxyethoxy)silane, tetrakis(2-ethylhexoxy)silane, tetraallyloxysilane and octamethyltrisiloxane.

The slurry of the carrier material and of organomagnesium composition in the solvent is maintained at temperatures of about 40° to about 60° C., for introduction of the silane compound. The silane compound is introduced after organomagesium incorporation and preferably before transition metal incorporation into the catalyst. The amount of the silane compound added to the slurry is such that the molar ratio of silane to Mg on the solid carrier is about 0.20 to about 1.40, preferably about 0.30 to about 0.90, more preferably about 0.50 to about 0.80 and most preferably about 0.66.

The slurry is contacted with at least one transition metal compound soluble in the non-polar solvent, preferably, after the addition of the silane compound is completed. This synthesis step is conducted at about 25° to about 65° C., preferably at about 30° to about 60° C., and most preferably at about 45° to about 55° C. In a preferred embodiment, the amount of the transition metal compound added is not greater than that which can be deposited onto the carrier. The exact molar ratio of Mg to the transition metal and of the transition metal to the hydroxyl groups of the carrier will therefore vary (depending, e.g., on the carrier drying temperature) and must be determined on a case-by-case basis. For example, for the silica carrier heated at about 200° to about 850° C., the amount of the transition metal compound is such that the molar ratio of the transition metal, derived from the transition metal compound, to the hydroxyl groups of the carrier is about 1 to about 2.0, preferably about 1.3 to about 2.0. The amount of the transition metal compound is also such that the molar ratio of Mg to the transition metal is about 1 to about 3, preferably about 1 to about 2.

Suitable transition metal compounds used herein are compounds of metals of Groups IVA, VA, VIA or VIII of the Periodic Chart of the Elements, as published by the Fisher Scientific Company, Catalog No. 5-702-10, 1978 providing that such compounds are soluble in the non-polar solvents. Non-limiting examples of such compounds are titanium halides (e.g., where the halide portion thereof is Cl or Br), e.g., titanium tetrachloride, $TiCl_4$, titanium alkoxides (e.g., where the alkoxide portion thereof is a $C_1$–$C_6$ alkoxide), or mixtures thereof, and vanadium halides, vanadium tetrachloride, $VCl_4$, vanadium oxytrichloride, $VOCl_3$, titanium and vanadium alkoxides, wherein the alkoxide moiety has a branched or unbranched alkyl radical of 1 to about 20 carbon atoms, preferably 1 to about 6 carbon atoms. The preferred transition metal compounds are titanium compounds, preferably tetravalent titanium compounds. The most preferred titanium compound is titanium tetrachloride. Mixtures of such transition metal compounds may also be used and generally no restrictions are imposed on the transition metal compounds which may be included. Any transition metal compound that may be used alone may also be used in conjunction with other transition metal compounds.

The reaction of the transition metal compound, such as the tetravalent titanium compound, in the liquid medium conveniently takes place by slurrying the solid carrier containing the reactive magnesium composition in a solution of the tetravalent titanium compound and heating the liquid reaction medium to a suitable reaction temperature, e.g., to the reflux temperature of the solvent at standard atmospheric pressure. Thus, the reaction may take place under reflux conditions. Preferred solvents for the tetravalent titanium compound are hexane or isopentane.

The various reaction parameters are subject to a wide variety of possibilities, suitable selection of such parameters being well within the skill of those having ordinary skill in the art. However, for example, the volume of tetravalent titanium solution to treated carrier initially slurried in the solution may be from about 0.1 to about 10 mls per gram of such carrier. The concentration of the tetravalent titanium solution may be, for example, from about 0.1 to about 9 Molar. The amount of tetravalent titanium in solution may be, e.g., in excess of the molar amount of organomagnesium earlier used to treat the carrier. More particularly, for example, the molar ratio of tetravalent titanium to organomagnesium may be from about 0.5 to about 5, more particularly from about 0.7 to about 1.4. Unreacted titanium may be removed by suitable separation techniques such as decantation, filtration and washing.

A suitable activating amount of the activator may be used. The number of moles of DMAC activator per gram atom of titanium in the catalyst may be, e.g., from about 1 to about 100 and is preferably greater than about 5.

Film Production

In accordance with the process of film production, films of 0.5 to 1.5 mils can be produced; in some commercial applications films of about 0.5 mils are required.

In accordance with the invention, a melt of the linear low density polyethylene is fed through a gap in an annular die for extrusion in the form of a tube, which is moved vertically upward. Pressurized air is fed to the interior of the bubble formed by the tube, which blows it to a greatly increased diameter and correspondingly reduced wall thickness and results in biaxial orientation of the film. Cooling air is supplied to the exterior surface of a bubble, while the extruded tube of molten material is being drawn. Further handling usually involves collapsing the tube between a pair of rolls to a flattened double-wall web at a stage in the cooling at which the wall surfaces will not adhere to one another. The flattened tube is wound onto a roll and/or further processed.

Cooling air can be supplied to the exterior surface of a bubble by one or more cooling rings, each of which discharges one or more annular streams of cooling air for heat exchange engagement with the bubble exterior surface. Often a primary ring in the immediate neighborhood of the die orifice is employed with a more powerful secondary ring spaced along the path of the bubble at a location at which the melt, while still not solidified, has cooled sufficiently to withstand the force of the more powerful secondary ring air stream or streams.

These air rings can be configured, prearranged, not only to cool, but also to shape, the tube of molten resin. Controlling the configuration of the tube and bubble, by such air rings is described in U.S. Pat. No. 4,118,453 which is incorporated by reference herein. The internal pressure of the tube is maintained by employing pressurized gas (air) during passage of the tube through the air rings. The apparatus in which such means are used are sometimes referred to as "stalk extruders"; stalk extruders are commercially available from Alpine.

Thus in accordance with the invention the process comprises extruding the LLDPE having $M_z/M_w > 3.5$ through an annular die to form an extruded tube of molten material, cooling the extruded tube while drawing the tube so cooled, expanding the tube to attenuate the walls thereof by introducing a gas to the interior of the tube, and flowing a cooling gas in contact with the outer surface of said tube from a plurality of annular zones about said extruded tube spaced along the axis thereof and being of increasing diameter in the direction away from the point of extrusion; the plurality of annular zones can be provided by circular pairs of annular zones about said extruded tube. In U.S. Pat. No. 4,118,453, incorporated by reference herein, as noted above, additional separate pairs of cooling gas confined streams are directed against said film on each side of a shape restricting surface which extends beyond the discharge boundaries of the discharged confined streams; the said additional cooling gas streams are passed in contact with the outer surface of said film tube at each of said shape restricting surfaces to produce a positive gas pressure zone between said surface and said film material and then said cooling gas is withdrawn from such contact between each pair of adjacent cooling gas inlets.

In accordance with the invention the molten linear low density polyethylene, described above, is formed into a tube or a bubble having at least two different diameters, the smaller of the two diameters being substantially that of the die and the second diameter of the bubble exceeding that diameter of the die, with a frost height line downstream of the portion of the bubble having said smaller diameter and downstream of the portion of the bubble having said second diameter. The Frost line is the line where the extruded tube or bubble changes from molten to solid character.

While the diameter of the tube is that of the die, the stresses, as well as machine direction (MD) orientation, in the melt relax; this stage of the process has been found to be critical to increase in MD tear resistance and impact resistance. As the tube diameter increases, the pressure increases within the bubble; that is the pressure differential between the inside of the tube and the external surface of the tube increases as the diameter increases. The increase in diameter can be 3:1 to 5:1 and up to 7:1 to 9:1 times the die diameter. This expansion in bubble diameter occurs before the melt turns into a solid. As suggested above, the frost line height is where the film is below its melting point with no more expansion in the transverse direction and so no increase in bubble diameter. The resulting films have thicknesses ranging from 0.2 to 2.0, preferably ranging from 0.3 to 1.5, and most preferably ranging from 0.3 to 1.0.

The following examples further illustrate the essential features of the invention. However, it will be apparent to those skilled in the art that the specific reactants and reaction conditions used in the Examples do not limit the scope of the invention.

The properties of the polymers produced in the Examples were determined by the following test methods:

| | |
|---|---|
| Density | ASTM D-1505 - a plaque is made and conditioned for one hour at 100° C. to approach equilibrium crystallinity. Measurement for density is then made in a density gradient column; reported as gms/cc. |

-continued

| | |
|---|---|
| Melt Index (MI), $I_2$ | ASTM D-1238 - Condition E Measured at 190° C. - reported as grams per 10 minutes. |
| High Load Melt Index, used in the melt index test above. | ASTM D-1238 - Condition F Measured at 10.5 (HLMI) times the weight $I_{21}$ |
| Melt Flow Ratio (MFR) | $\dfrac{I_{21}}{I_2}$ |

EXAMPLES

Example 1
(Catalyst Precursor Synthesis)

A catalyst precursor was synthesized according to the teachings of Yamaguchi et al, U.S. Pat. No. 3,989,881, and Karol et al, European Patent Application 84103441.6.

(a) Preparation of Precursor

In a 12 liter flask equipped with a mechanical stirrer were placed 41.8 g (0.439 mol) of anhydrous $MgCl_2$ and 2.5 liters of tetrahydrofuran (THF). To this mixture, 29.0 (0.146 mol) of TiCl 0.33 $AlCl_3$ powder were added over a ½ hour period. The mixture was then heated at 60° C. for another ½ hour in order to completely dissolve all materials.

Separately, five hundred grams of silica were dehydrated by heating at a temperature of 600° C. and slurried in 3 liters of isopentane. The slurry was pretreated with 186 ml of a 20 percent by weight solution of TEAL in hexane which was added to the stirred silica slurry over a ¼ hour period. The resulting mixture was then dried under a nitrogen purge at 60° C. over a period of about 4 hours to provide a dry, free-flowing powder containing 5.5 percent by weight of the aluminum alkyl.

The pretreated silica was then added to the solution of the catalyst precursor prepared as above. The resulting slurry was stirred for ¼ hour and then the solvent (THF) was dried under a nitrogen purge at 60° C. over a period of about 4 hours to provide free-flowing powder of the catalyst precursor.

(b) Preparation of Modified Precursor

The precursor composition of example 1(a) was modified as taught by Karol et al, European Patent Application 84103441.6. The silica-impregnated precursor composition prepared in accordance with Example 1(a) was slurried in 3 liters of anhydrous isopentane and stirred while a 20 percent by weight solution of diethylaluminum chloride (DEAC) in anhydrous hexane was added thereto over a ¼ hour period. The DEAC solution was employed in an amount sufficient to provide 0.4 mols of this compound per mol of the remaining solvent (THF) in the precursor. After addition of DEAC was completed, stirring was continued for ¼ to ½ hour while a 20 percent by weight solution of tri-n-hexylaluminum (TNHAL) in anhydrous hexane was added in an amount sufficient to provide 0.2 mols of this compound per mol of remaining THF in the precursor. The mixture was then dried under a nitrogen purge at a temperature of 65±10° C. over a period of about 4 hours to provide free-flowing powder.

The amount of DEAC and TnHAL in the tested precursors was varied, as indicated in the following tables.

EXAMPLES (C) The DMAC cocatalyst containing composition used in the Examples below was formed from a catalyst precursor, which was in some instances noted in the following table preactivated with DEAC and TnHAL.

| Sample | Catalyst Precursor DEAC/TnHAL | Cocatalyst Type | PPM | $P_E$ | $C_6/C_2$ | $H_2/C_2$ | T. °C. | Productivity |
|---|---|---|---|---|---|---|---|---|
| A1 | 10/10 | DMAC | 250 | 125 | .08 | .45 | 90 | 2500 |
| A2 | 10/10 | DMAC | 250 | 125 | .08 | .45 | 90 | 2500 |
| B | 40/20 | TMA | 120 | 115 | .07 | .25 | 90 | 3000 |
| C1 | 0/0 | DMAC | 400 | 100 | .11 | .44 | 87 | 2600 |
| C2 | 0/10 | DMAC | 250 | 125 | .12 | .36 | 87 | 2400 |
| D | 40/20 | TMA | 100 | 95 | .14 | .2 | 87 | 5000 |

The comonomer used in all the examples is 1-hexene.

Example 2

In this example the performance of a DMAC cocatalyzed LLDPE and a normal LLDPE were compared in a stalk and non-stalk extrusion condition. The film gauge is 1.5 mils in both cases. The high stalk extrusion was conducted on the 50 mm Alpine extruder under the following conditions: BUR= 3:1, 15" stalk height, 65 lbs/hr. The non-stalk extrusion was done on a 2.5" Sterling extruder under the following conditions: 2:1 BUR, 20" FLH, 130 lbs/hr, 100 mil die gap. Results are as follows:

| | A1 Alpine B | | A2 Sterling B | |
|---|---|---|---|---|
| | DMAC | TMA | DMAC | TMA |
| Resin Cocatalyst | | | | |
| Density | .929 | .929 | .9.29 | .929 |
| MI | .8 | .8 | .8 | .8 |
| MFR | 27.5 | 25.0 | 28.2 | 25.0 |
| Film Properties | | | | |
| Dart Impact, gms | 200 | Could not run* | 160 | 155 |
| MD Tear, gms/mil | 290 | | 135 | 150 |

Example 2

In this example properties were compared at a lower resin density. The conditions were as follows-on the Alpine: 4:1 BUR, 15" stalk-height, 70 lbs/hr; on the Sterling: 2:1 BUR, 130 lbs/hr, 17" FLH, 100 mil die gap.

|  | C1 Alpine D (0.4 mil) | | C2 Sterling D (1.0 mil) | |
| --- | --- | --- | --- | --- |
|  | DMAC | TMA | DMAC | TMA |
| Resin Cocatalyst |  |  |  |  |
| Density | .920 | .920 | .920 | .920 |
| MI | 0.84 |  | 0.7 | 0.9 |
| MFR | 28.6 |  |  |  |
| Film Properties |  |  |  |  |
| Dart Impact, gms | 465 | Could* not run | 255 | 180 |
| MD Tear, gms/mil | 485 |  | 280 | 320 |

*The TMA cocatalyst produced resin could not be run under high stalk extrusion conditions because of bubble instability, over a wide range of test conditions.

Thus it is apparent that there has been provided, in accordance with the invention, a LLDPE film that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A process for producing a film, which comprises providing a resin which is a linear low density polyethylene comprising at least about 80 percent by weight of ethylene units wherein the molecular weight distribution, measured by a ratio of z average molecular weight to weight average molecular weight ($M_z/M_w$) which is greater than 3.5, extruding said resin through an annular die to form an extruded tube of molten material to provide the tube with a tube diameter which is substantially the annular die diameter;

while continuously extruding the tube, expanding the tube, downstream of said annular die, to attenuate the walls thereof to form the tube of molten material into a bubble of a bubble diameter which exceeds (1) the annular die diameter and (2) the tube diameter;

wherein said bubble has a frost line which comprises a demarcation line between said molten material and solid biaxially oriented film; and producing said film of a thickness ranging from 0.25 to 2.0 mils, exhibiting an impact strength, determined by ASTM D-1709 of 150 to 800, and a MD tear resistance as determined by ASTM D-1922 of 200 to 500, comprising a copolymer of linear low density polyethylene comprising at least about 80 percent by weight of ethylene units and the remainder being an alpha olefin of 3 to 10 carbon atoms.

2. The process of claim 1, wherein said continuously extruding further includes cooling the tube.

3. The process of claim 2, wherein cooling the extruded tube comprises flowing a cooling gas in contact with the outer surface of said tube.

4. The process of claim 3, wherein cooling the extruded tube comprises flowing a cooling gas in contact with the outer surface of said tube from an annular zone about said extruded tube spaced along the axis thereof and having a diameter sufficient to provide a tube diameter which is substantially the annular die diameter;

wherein said cooling gas is passed in contact with the outer surface of said tube to produce a positive gas pressure zone at said outer surface.

5. The process of claim 1, which further includes expanding the tube to attenuate the walls to form said bubble by increasing the pressure within the tube to create a positive pressure differential between the inside of the tube and the outer surface of the tube.

6. The process of claim 5, wherein cooling the extruded tube comprises flowing a cooling gas in contact with the outer surface of said tube from an annular zone about said extruded tube spaced along the axis therof and having a diameter sufficent to provide a tube diameter which is substantially the annular die diameter;

wherein said cooling gas is passed in contact with the outer surface of said tube to produce a positive gas pressure zone at said outer surface.

7. The process of claim 1, wherein the alpha olefin is 1-hexene.

8. The process of claim 7, wherein the copolymer is formed in the presence of a composition containing dimethylaluminum chloride.

9. The process of claim 1, wherein the copolymer is formed in the presence of a composition containing dimethylaluminum chloride.

10. The process of claim 9, wherein the copolymer contains 70 to 350 ppm dimethylaluminum chloride.

11. The process of claim 1 wherein the linear low density polyethylene has an MFR of 20 to 40.

12. The process of claim 1, wherein the as-formed copolymer contains 70 to 350 ppm dimethylaluminum chloride.

13. The process of claim 1, wherein the film exhibits an MD tear value of 250 to 500.

14. A process for producing a an polyethylene film, which comprises providing a resin which is a linear low density polyethylene comprising at least about 80 percent by weight of ethylene units comprising a copolymer of linear low density polyethylene comprising at least about 80 percent by weight of ethylene units and the remainder being an alpha olefin of 3 to 10 carbon atoms, wherein the molecular weight distribution, measured by a ratio of Z average molecular weight to weight average molecular weight is greater than 3.5 extruding said resin through an annular die to form an extruded tube of molten material to provide the tube with a tube diameter which is substantially the annular die diameter;

while continuously extruding the tube, expanding the tube, downstream of said annular die, to attenuate the walls thereof to form the tube of molten material into a bubble of a bubble diameter which exceeds (1) the annular die diameter and (2) the tube diameter;

wherein said bubble has a frost line which comprises a demarcation line between said molten material and solid biaxially oriented film; and producing said film of a thickness ranging from 0.25 to 2.0 mils, exhibiting an impact strength, determined by ASTM D-1709 of 800 to 1000, and a MD tear resistance as determined by ASTM D-1922 of 200 to 500.

15. The process of claim 14, wherein said continuously extruding further includes cooling the tube.

16. The process of claim 15, wherein cooling the extruded tube comprises flowing a cooling gas in contact with the outer surface of said tube.

17. The process of claim 16, wherein cooling the extruded tube comprises flowing a cooling gas in contact with the outer surface of said tube
from an annular zone about said extruded tube spaced along the axis therof and having a diameter sufficent to provide a tube diameter which is substantially the annular die diameter;
wherein said cooling gas is passed in contact with the outer surface of said tube to produce a positive gas pressure zone at said outer surface.

18. The process of claim 14, which further includes expanding the tube to attenuate the walls to form said bubble by increasing the pressure within the tube to create a positive pressure differential between the inside of the tube and the outer surface of the tube.

19. The process of claim 18, wherein cooling the extruded tube comprises flowing a cooling gas in contact with the outer surface of said tube
from an annular zone about said extruded tube spaced along the axis therof and having a diameter sufficent to provide a tube diameter which is substantially the annular die diameter;
wherein said cooling gas is passed in contact with the outer surface of said tube to produce a positive gas pressure zone at said outer surface.

20. The process of claim 14, wherein the alpha olefin is 1-hexene.

21. The process of claim 14, wherein the copolymer is formed in the presence of a composition containing dimethylaluminum chloride.

22. The process of claim 14 wherein the linear low density polyethylene has an MFR of 20 to 40.

23. The process of claim 14 wherein the as-formed copolymer contains 70 to 350 ppm dimethylaluminum chloride.

24. The process of claim 14, wherein the film exhibits an MD tear value of 250 to 500.

* * * * *